N. G. KRIMMEL.
MOVABLE HEADLIGHT SUPPORT.
APPLICATION FILED APR. 16, 1912.

1,053,832.

Patented Feb. 18, 1913.
2 SHEETS—SHEET 1.

Witnesses
E. O. Crocker
Dudley B. Howard

Inventor
Ned G. Krimmel,
By Victor J. Evans
Attorney

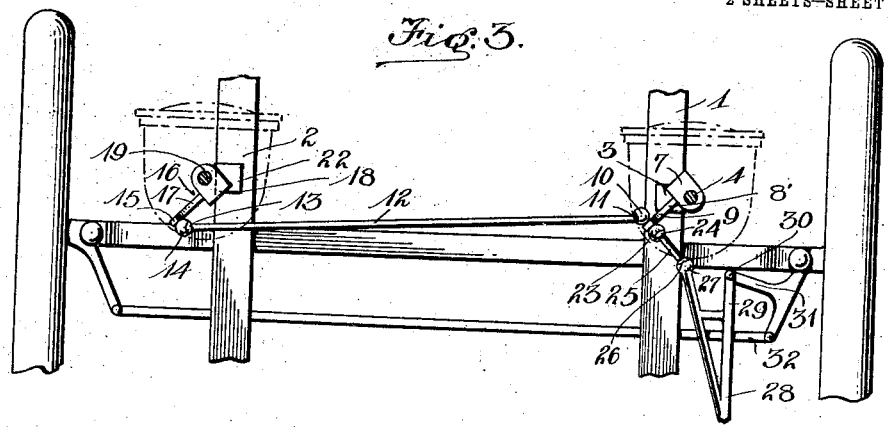
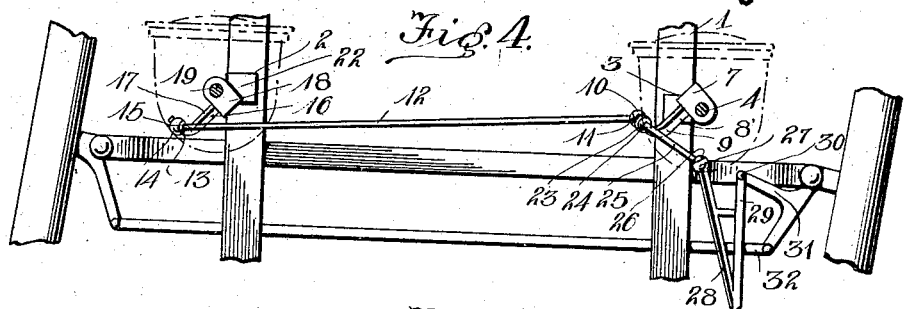
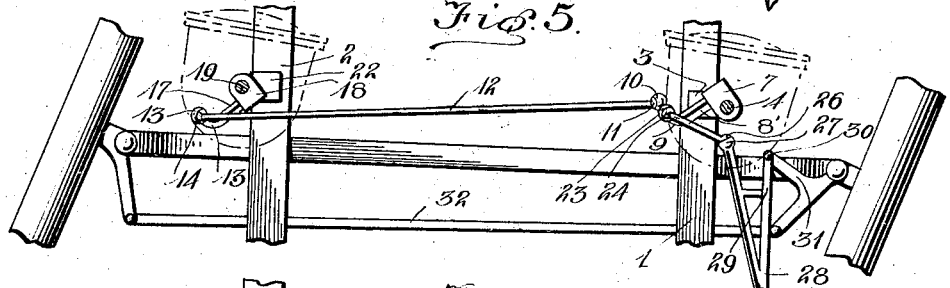
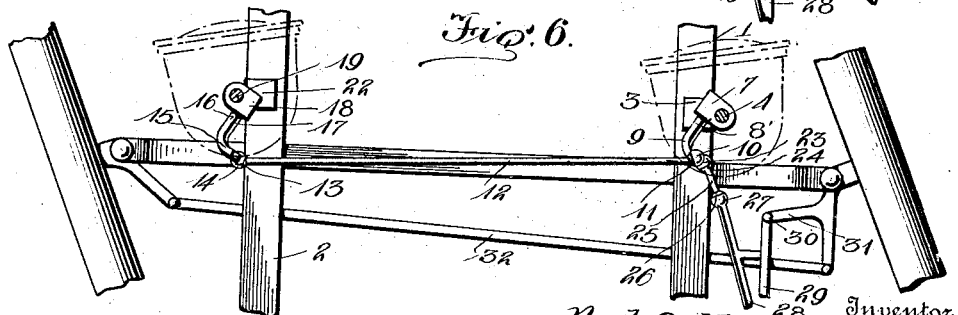

UNITED STATES PATENT OFFICE.

NED GENSEMER KRIMMEL, OF PINE GROVE, PENNSYLVANIA.

MOVABLE HEADLIGHT-SUPPORT.

1,053,832.  Specification of Letters Patent.  Patented Feb. 18, 1913.

Application filed April 16, 1912. Serial No. 691,253.

*To all whom it may concern:*

Be it known that I, NED GENSEMER KRIMMEL, a citizen of the United States, residing at Pine Grove, in the county of Schuylkill and State of Pennsylvania, have invented new and useful Improvements in Movable Headlight-Supports, of which the following is a specification.

My invention relates to movable headlight supports for automobiles, and in particular to supports of this type which are automatically operated by the steering mechanism of the machine.

An object of the invention is the provision of means for operating the headlight supports which will be rendered operable only upon considerable turning movement of the machine.

When an automobile is being driven along a direct narrow road, frequent slight deviations in the course of the machine are necessary to avoid obstructions or roadway defects, and yet it is not desirable to have the rays of light from the headlights deflected out of the general course of travel. On the other hand when the machine is rounding a curve it is necessary that the lamps should throw their rays in the general direction of travel, which, in this case is not straight ahead.

It is, therefore, the object of my invention to provide means for automatically controlling the movement of the headlights in direct accordance with the degree of change in the machine's course.

Further objects of the invention will appear as the following specific description is read in connection with the accompanying drawings, which form a part of this specification, in which:—

Figure 1:
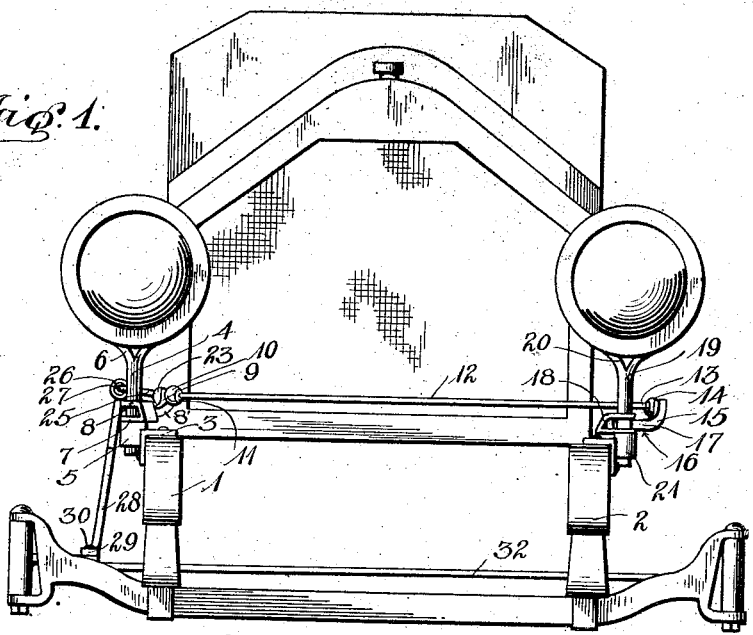
Figure 2:
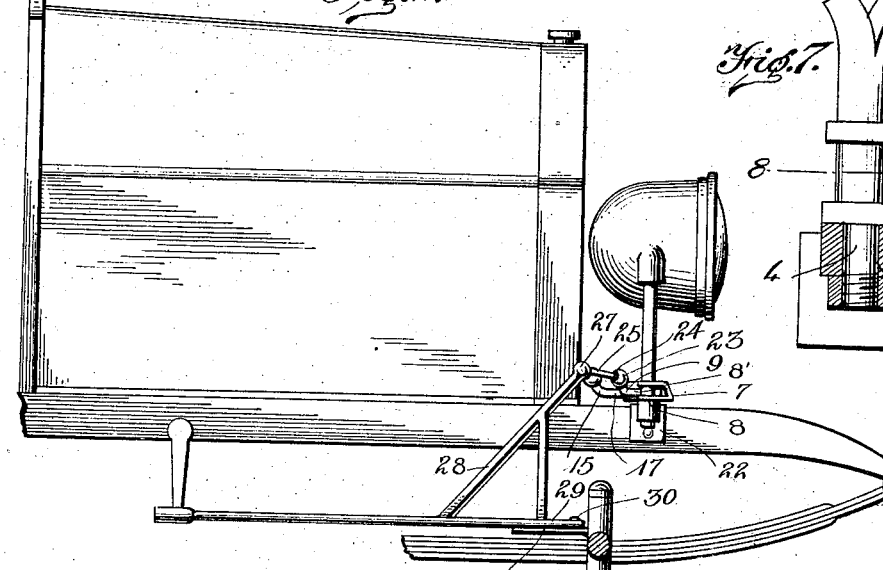
Figure 7:
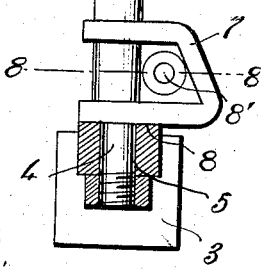
Figure 8:
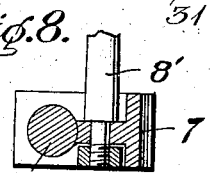

Figure 1 is a front elevation of the device. Fig. 2 is a side elevation. Fig. 3 is a broken plan view showing the steering mechanism set for straight forward motion of the machine. Fig. 4 is a similar view showing the steering mechanism set for slight change in the course. Fig. 5 is a similar view showing the steering mechanism adjusted for sufficient change in direction to the right to turn the lamps accordingly. Fig. 6 is a similar view showing the steering mechanism set for turning to the left sufficiently to operate the lamps. Fig. 7 is a fragmentary front elevation of one of the lamp supporting shafts, showing means for attaching the lamp operating member to the yoke member thereon. Fig. 8 is a detail, horizontal sectional view through the yoke member and shaft, showing the operating member broken away.

In the drawings the numerals 1 and 2 designate the side members of the chassis of the machine. Mounted upon the member 1 is a bearing bracket 3. A shaft 4 is rotatably mounted in the vertical opening 5 of the bracket 3 and is provided at its upper extremity with the lamp supporting bracket arms 6. A yoke member 7 is rigidly secured to the shaft 4 so as to bear upon the upper surface 8 of the bearing bracket. This yoke member is positioned so that a vertical plane passing longitudinally through the same will intersect at an acute angle the vertical plane in which the bracket arms 6 lie. A lamp operating member 8' has its reduced cylindrical forward end $8^a$ rotatably mounted within an opening $8^b$ in the web portion $7^a$ of the yoke member 7, and is secured in this position with its shoulder $8^c$ abutting the said web by means of an adjustable nut $7^b$ threaded on to the end of its threaded extremity. The rearward portion of the member 8 is curved as at 9 and provided on its inner surface with a socket 10 for the reception of a ball 11 formed on one extremity of a connecting rod 12. The opposite extremity of the rod 12 is provided with a ball 13 adapted to be received by a socket 14 on the inner surface of the curved portion 15 of a second lamp operating member 16. The forwardly extending portion 17 of this member 16 is rotatably mounted in a similar yoke member 18 secured to the vertical shaft 19 whose bracket arms 20 are adapted to support the other headlight. The shaft 19 is rotatably mounted in the vertical opening 21 of the bearing bracket 22 mounted on the frame member 2. A socket 23 is provided on the rear side of the curved portion 9 of the operating member 8 and is adapted to receive a ball 24 formed on one extremity of a second connecting rod 25 whose opposite extremity is provided with a similar ball 26 adapted to be received by a socket 27 on the forward end of the reach bar 28 of the steering mechanism. An angular lateral extension 29 of the reach bar 28 has its forward extremity pivoted to the end of an arm 30, extending laterally from the spindle operating arm 31, whose rearward extremity is in turn pivoted to one end of the usual cross bar 32.

It will be seen by reference to Fig. 3 that when the machine is going straight forward, the curved portions 9 and 15 of the lamp operating members 8 and 16 respectively will extend upwardly in nearly vertical positions. When the reach bar 28 of the steering mechanism is thrown forward in order to turn the wheels to the right through the medium of the arms 30 and 31, the ball 26 on the connecting rod 25 will be forced forward by the socket 27. The ball 24 on the opposite end of the rod 25 will act against the socket 23 so as to force the upturned portion 9 of the operating member 8 forward, its forward extremity thereby rotating within the yoke member 7. Through the medium of the connecting rod 12, the operating member 16 will be similarly actuated. As shown in Fig. 4 of the drawing, limited operation of the steering mechanism will simply tend to rotate the members 8 and 16 until their curved portions 9 and 15 respectively, lie in a horizontal plane. Further operation will cause these operating members to oscillate forward and thus impart rotary motion to the lamp supporting shafts 4 and 19, as shown by Fig. 5. When the reach bar 28 is operated in a reverse direction, the members 8 and 16 will be rotated within the yoke members 7 and 18 so that their curved portions 9 and 15 respectively will fall backward into a horizontal plane. Thus if the operation be continued, these members 8 and 16 will be oscillated so as to turn the lamps to the left correspondingly with a similar turning of the wheels.

I claim:—

1. A device of the class described comprising a support, a pair of bearing brackets carried by said support, lamp supporting shafts rotatably mounted in said brackets, yoke members carried by said supporting shafts, operating members rotatably mounted in said yoke members, and means for imparting rotary motion to said operating members upon limited operation of the steering mechanism, said means serving to impart oscillatory movement to the operating members upon further movement.

2. A device of the class described comprising a support, a pair of spaced bearing brackets carried by said support, a lamp supporting shaft rotatably mounted in each of said brackets, a yoke member carried by each supporting shaft, a pair of operating members each comprising a horizontal portion rotatably mounted in one of said yoke members and an upturned vertical portion extending inwardly therefrom, a connecting rod disposed between said operating members, a universal joint connecting one end of said connecting rod with the upturned end of the corresponding operating member, the universal joint connecting the opposite end of said rod with the upturned end of the other operating member, a second connecting rod having its rearmost end connected by means of a universal joint with the forwardly extending reach bar of the steering mechanism, and a universal joint connecting the opposite end of the second connecting rod with the upturned end of the adjacent operating member, said second connecting rod being inclined upwardly and forwardly.

In testimony whereof, I affix my signature in presence of two witnesses.

NED GENSEMER KRIMMEL.

Witnesses:
 JOE. J. KRIMMEL,
 HARRY L. GENSEMER.

Copies of this patent may be obtained for five cents each, by addressing the "Commissioner of Patents, Washington, D. C."